United States Patent Office 3,428,872
Patented Feb. 18, 1969

3,428,872
BODY COMPRISING A MARK FOR INDIRECT DETECTION OF AN OBJECTIVE PART AND METHOD OF DETECTING THE POSITION OF SAID OBJECTIVE PART
Hisashi Yoshida, Yuzaburo Sakamoto, Takeshi Hosaka, and Toshio Numakura, Kodaria-shi, and Kenichi Isoda, Kokubunji-shi, Japan, assignors to Hitachi, Ltd., Tokyo, Japan, a corporation of Japan
Filed July 29, 1966, Ser. No. 568,916
Claims priority, application Japan, July 31, 1965, 40/46,439
U.S. Cl. 317—234        12 Claims
Int. Cl. H01l 3/00, 5/00

ABSTRACT OF THE DISCLOSURE

Body comprising a mark for indirect detection of an objective part wherein there is provided at a place which lies on one principle surface of a body to be detected and which is separated from an objective part whose position is to be detected, a detection mark comprising at least one straight line perpendicular to an imaginary center line passing through said objective part and lying on said principle surface, and at least one straight or arcuate line intersecting said imaginary line obliquely, by which mark the said objective part can be detected indirectly, and method of detecting the position of said objective part.

---

Figure 1:
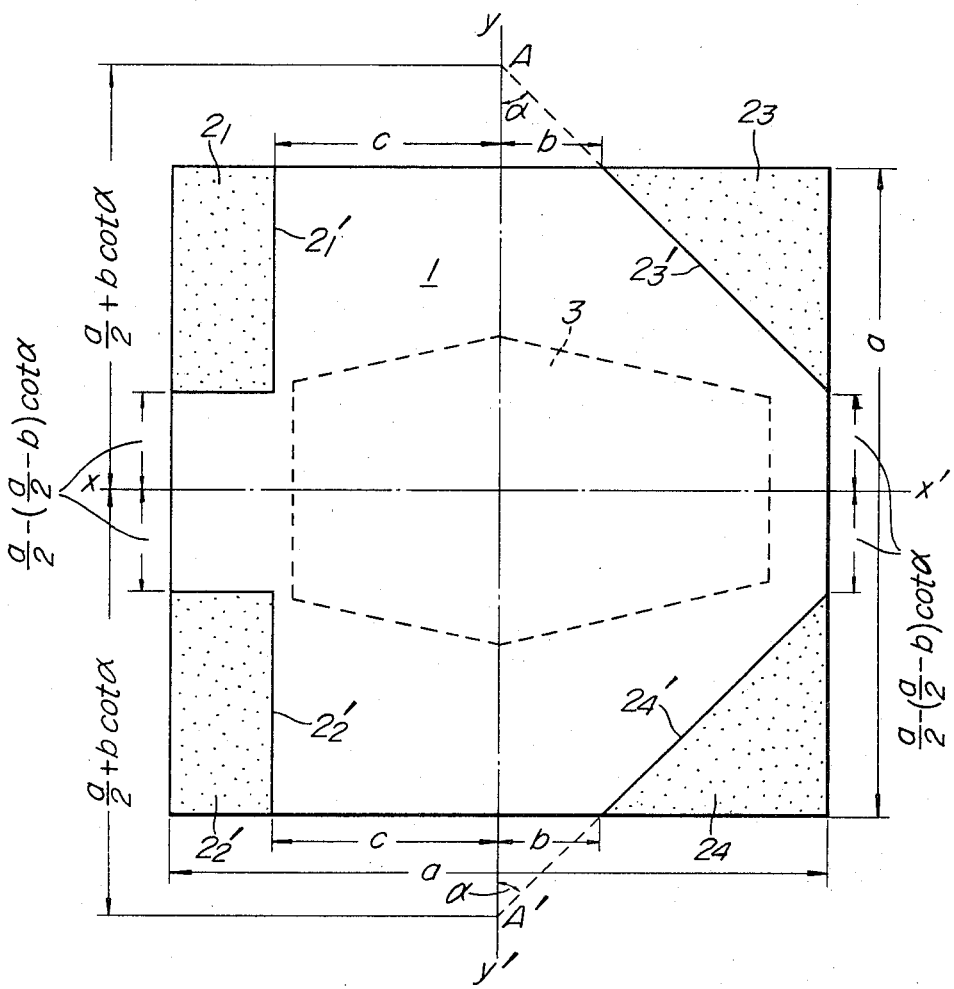

This invention relates to a structure suitable for simple and reliable detection of the position of an objective part on a very small body such as a semiconductor element, or a body having a very complex external form.

When a machine, for instance, an automatic processing machine, which generally treats a very small body, is used, position control of high reliability is required in mounting the work at the right place and/or in locating a processing tool at the right position with respect to the mounted work.

In order to achieve the above-mentioned requirements, various methods concerning completely automatic position detection of a workpiece have been proposed and put into practice.

For example, when the process of attaching a fine wire to a minute electrode provided on a surface of a semiconductor pellet is performed with an automatic machine, it is necessary to detect accurately the displacement of said electrode relative to a standard position and to control the positioning of the attaching tool with respect to the position of said electrode in order to correctly attach the wire to the electrode. According to a conventional method, a difference in optical properties of the minute electrode to be detected and the part surrounding said electrode (the difference in optical properties here means a difference of reflectivity etc.) is utilized for position detection, and more specifically, light from a luminous source is projected on a pellet whose position being to be detected, the reflected light therefrom is projected by a projector onto a screen to form a magnified real image of the pellet, and said image is scanned by a suitable method to obtain an electric signal corresponding to a deviation of said image with respect to a predetermined standard position. According to the conventional method described above, it is rather easy to detect the position of an electrode having a relatively simple form.

As the form of an electrode becomes complicated, however, the electric signal obtained becomes correspondingly more complicated, and thus signal processing becomes more difficult. Moreover, as the form of the electrode to be detected changes, detectors of a different system are required. Accordingly, various types of detectors must be provided each of which corresponds to a pellet having some particular form of electrode, and this fact has been a great obstacle, from an economic viewpoint, to the wide spread use of automatic machines of the kind described.

It is, therefore, an object of the present invention to provide a structure which facilitates simple and precise position detection of an objective part on a body irrespective of the structure or form of the objective part.

It is another object of the present invention to provide an improved method to detect the position of an objective part easily and accurately.

According to a feature of the invention, a common mark can be used regardless of the form of an objective part and so the detection method is greatly simplified.

According to another feature of the invention, there is provided other advantages; e.g., a mark can be formed quite easily because of its simple structure and the required accuracy can be obtained with no great difficulty as to the position of the mark relative to the position of an objective part.

Now, the mark for position detection described above should fulfill the following general requirements:

(a) A mark should be formed, on the surface of a pellet, of a material which is quite different in reflectivity from the remaining surface of the pellet, (b) The form of a mark should be such as to be easily detected, (c) The area occupied by the mark should be made as small as possible and the mark should be placed in a suitable position so that the electrode or the other parts might not give unwanted signals while the body is being scanned, (d) The mark should be prepared in an appropriate position easily as well as accurately, (e) The mark should not exert any bad influences upon electrical, mechanical or life properties of the finished semi-conductor products, and so on.

All the requirements mentioned above are satisfied by a mark for position detection formed according to the present invention.

It is an essential feature of the present invention that there is provided at a place which lies on one principal surface of a body to be detected and which is separated from an objective part whose position is to be detected a detection mark comprising at least one straight line perpendicular to an imaginary center line passing through said objective part and lying on said principal surface, and at least one straight or arcuate line intersecting said imaginary center line obliquely, by which mark the said objective part can be detected indirectly.

Other features and advantages of the present invention will become more apparent from the following detailed description of one form of embodiment applied to the manufacture of a semiconductor device which is given by way of example and illustrated in the accompanying drawings. It is to be noted, however, that the embodiment described hereinbelow is only an example and that the scope of the present invention is not restricted in application to the manufacture of semiconductor devices.

Figure 2:
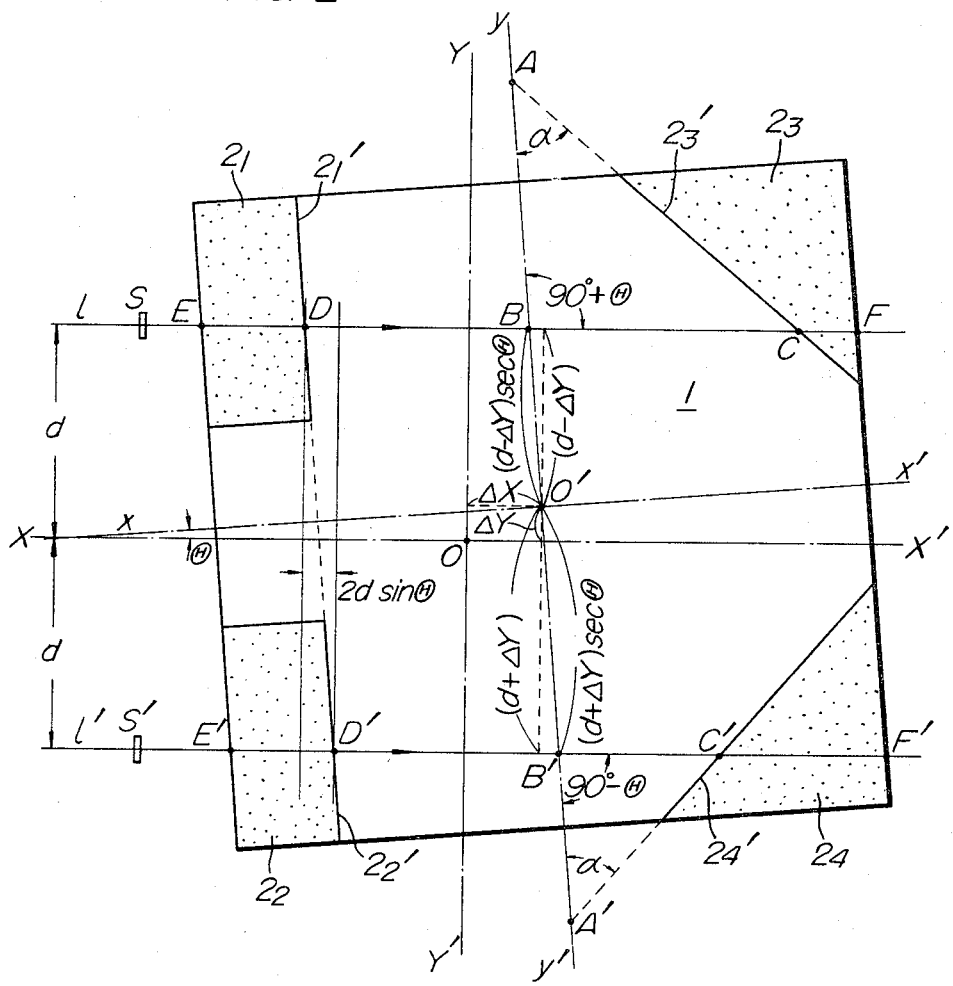
Figure 3A:
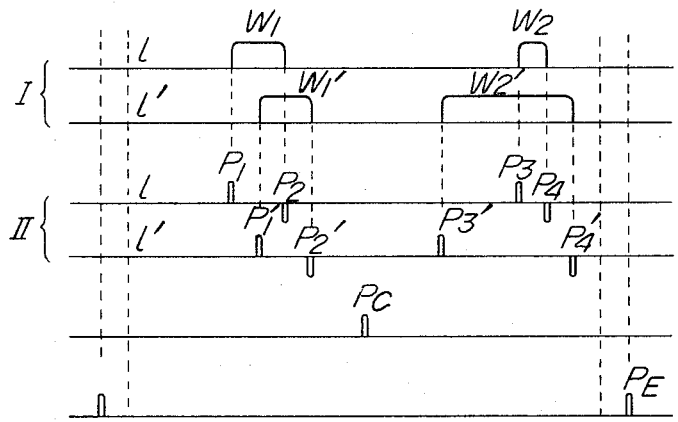
Figure 3B:
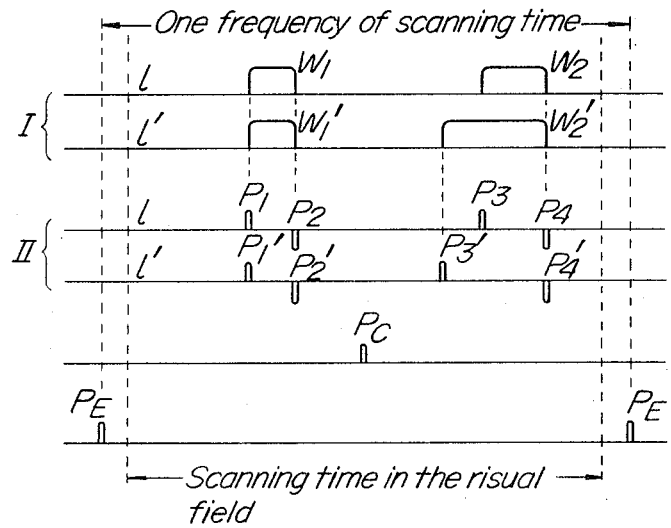
Figure 4:
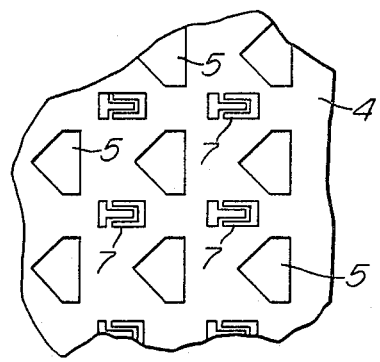
Figure 5:
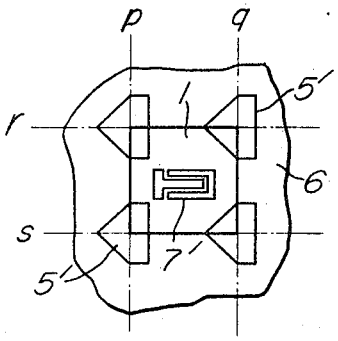

Referring to the drawings:

FIG. 1 is a plan view of an embodiment of a mark for position detection formed according to the present invention, FIG. 2 is a diagram analyzing a form of a detection mark according to the invention, FIGS. 3(a) and 3(b) show an outline of signal waveforms $\overline{EF}$ and $\overline{E'F'}$ obtained by scanning the pellet shown in FIG. 2 along scanning lines $l$ and $l'$, respectively, FIG. 4 is a plan view of a part of a mask used in forming a mark for position detection according to the invention, FIG. 5 is a plan view of a part of a semiconductor wafer comprising a detection mark formed by use of the mask shown in FIG. 4, and FIGS. 6(a), 6(b) and 6(c) are other examples of the detection mark according to the invention.

In FIG. 1, reference numeral 1 indicates a semiconductor pellet cut into a square of side length $a$. Reference numerals $2_1$, $2_2$, $2_3$ and $2_4$ designate marks for position detection provided on the semiconductor pellet. A region 3 in the center, which is surrounded by a dotted line, shows a region in which an electrode may be placed. Since a scanning line is rendered not to pass through this region, influence due to the form or the quality of the electrode will never be included in the signal obtained by the scanning, provided that the electrode lies in this region. The surface state of the parts of marks for position detection $2_1$, $2_2$, $2_3$ and $2_4$ is made such that the intensity of the reflected light is stronger there than at the other surface portions adjacent the parts of marks on the pellet.

Lines $2_1'$, $2_2'$, $2_3'$ and $2_4'$ show boundary lines discriminating two surface states characterized by different intensity of reflected light, and the relation therebetween has a significant meaning in the present invention. Namely, in this invention, line $2_1'$ and line $2_2'$ are arranged so that they may be orthogonal to an imaginary center line (line $x$–$x'$ in FIG. 1) and lines $2_3'$ and $2_4'$ are arranged so that they may cross said imaginary center line obliquely. In addition, lines $2_1'$ and $2_3'$, lines $2_2'$ and $2_4'$ are respectively paired to serve signal detection, and the two pairs are arranged in line symmetry with respect to the imaginary center line. It is to be noted that the lines $2_3'$ and $2_4'$ may be monotonically curved lines instead of straight lines.

In FIG. 1, the size of each part necessary for the following description is indicated for the sake of convenience either by a symbol or by an algebraic expression.

FIG. 2 is a diagram analyzing the mark shown in FIG. 1, in which XOX′ and YOY′ are the axis of a rectangular co-ordinate system fixed in a visual field of a projector and O is the origin thereof (this co-ordinate system will be abbreviated hereinafter as the X–Y co-ordinate system). $xO'x'$ and $yO'y'$ are the axis of a rectangular co-ordinate system fixed on the pellet and O′ is the origin thereof (hereinafter, this co-ordinate system will be referred to as the $x$–$y$ co-ordinate system).

In FIG. 2, the origin O′ of the $x$–$y$ co-ordinate system is shifted with respect to the origin O of the X–Y co-ordinate system by an amount ($\Delta X$, $\Delta Y$) when expressed in the X–Y co-ordinate system, and also the axis of the $x$–$y$ co-ordinate system are rotated by an angle $\theta$ with respect to the X–Y co-ordinate system. Therefore, it is possible to detect a plane displacement of the pellet by measuring $\Delta X$, $\Delta Y$ and $\theta$.

Among the various methods to measure $\Delta X$, $\Delta Y$ and $\theta$, there is a method in which a magnified view projected on a screen is scanned by a scanner comprising a slit S with a constant velocity and the light passing through the slit S is received by a photosensitive element such as a phototube or a photodiode to obtain an electric current corresponding to the intensity of the light. In FIG. 2, $l$ and $l'$ show scanning loci of said slit, and the slit S scans the lines, each of which is shifted on each side of the X–X′ axis of the X–Y co-ordinate system by a distance $d$ in parallel relations with the X–X′ axis, from left to right as indicated by arrows. Now, the waveform of the photoelectric current obtained when the slit S scans the pellet along the scanning locus $l$ with a constant velocity $v$ becomes as shown by $W_1$ and $W_2$ in FIG. 3(a)I, since a greater electric current is obtained when the slit passes through the part of the detection mark which produces a stronger intensity of reflected light than the adjacent surfaces. Here, $W_1$ and $W_2$ are waveforms obtained when the slit S moves along $\overline{ED}$ and $\overline{CF}$ on the scanning locus $l$ shown in FIG. 2, respectively. Similarly, $W_1'$ and $W_2'$ are waveforms obtained when the slit S′ moves along $\overline{E'D'}$ and $\overline{C'F'}$ on the scanning locus $l'$, respectively. In these cases, it is assumed that the slits S and S′ scan the projected image simultaneously and that the light passing through the two slits S and S′ is received by different phototubes (it is, of course, possible to let the slits S and S′ scan alternatively, to receive the light passing therethrough by the same phototube and to process the obtained signals alternatively in the same manner).

These waves $W_1$, $W_2$, $W_1'$ and $W_2'$ may be amplified, shaped or differentiated by an appropriate method to gain pulses $P_1$, $P_2$, $P_3$, $P_4$, $P_1'$, $P_2'$, $P_3'$, or $P_4'$ shown in FIG. 3(a)II. With these trains of pulses, a time interval $T_{23}$ between $P_2$ and $P_3$ and a time interval $T_{23}'$ between $P_2'$ and $P_3'$ are proportional to $\overline{DC}$ and $\overline{D'C'}$ shown in FIG. 2, respectively. Also a time interval $T_{22}'$ between $P_2$ and $P_2'$ is proportional to $2d \sin \theta$ which is the distance between the points D and D′ projected orthogonally onto the X–X′ axis.

Some simple formulas concerning the about description will now be written down.

$$DC = \overline{DB} + \overline{BC} = \overline{DB}$$
$$+ \sin \alpha \cdot \sec (\alpha+\theta) \left\{ \frac{a}{2} + b \cot \alpha - (d-\Delta Y) \sec \theta \right\} \quad (1)$$

$$\overline{D'C'} = \overline{D'B'} + \overline{B'C'} = \overline{D'B'}$$
$$+ \sin \alpha \cdot \sec (\alpha-\theta) \left\{ \frac{a}{2} + b \cot \alpha - (d+\Delta Y) \sec \theta \right\} \quad (2)$$

$$\overline{DB} = \overline{D'B'} \quad (3)$$

It may be easily understood from these relations that a difference of the time interval $T_{23}$ between $P_2$ and $P_3$ and the time interval $T_{23}'$ between $P_2'$ and $P_3'$ is expressed by the following equation. Namely, $$T_{23} - T_{23}' = \frac{1}{v}(\overline{DC} - \overline{D'C'}) = \frac{1}{v} = (\overline{BC} - \overline{B'C'})$$
$$= \left(\frac{a}{2} \sin \alpha + b \cos \alpha\right) \{\sec (\alpha+\theta) - \sec (\alpha-\theta)\} + \sin \alpha \cdot$$
$$\sec \theta \{(d+\Delta Y) \sec (\alpha-\theta) - (d-\Delta Y) \cdot \sec (\alpha+\theta)\} \quad (4)$$

(where $v$ is a scanning velocity of the slit S). Similarly, the time interval $T_{22}'$ between $P_2$ and $P_2'$ is expressed in the form $$T_{22}' = \frac{1}{v} \cdot 2d \sin \theta \quad (5)$$

In Equation 5, $T_{22}'$ is an odd function of $\theta$ only and independent of $\Delta X$ or $\Delta Y$, and assumes a positive or negative value accordingly as $\theta$ is positive or negative. Now, if $\theta$ is set equal to zero (where the condition $\theta=0$ means that the positions $P_2$ and $P_2'$ coincide) by rotating an appropriate image rotating means, e.g. an image rotating mirror, which is inserted in an optical system of a projector, then the value $\theta$ is detected from a rotation angle of the image rotating mirror. Further, when $\theta=0$, the X–Y co-ordinate axis and the $x$–$y$ co-ordinate axis shown in FIG. 2 becomes parallel and the waveforms of the output currents from the phototube become as shown in FIG. 3(b). In this case, Equations 4 and 5 are expressed in the following forms, respectively, $$T_{23} - T_{23}' = 2\Delta Y \cos \alpha \quad (6)$$
$$T_{22}' = 0 \quad (7)$$

Thus, $T_{22} - T_{23}'$ becomes an odd function of only $\Delta Y$ and assumes a positive or a negative value accordingly as $\Delta Y$ is positive or negative.

If a pulse $P_c$, which synchronizes the time when the slit S crosses the Y axis and thus indicates the central position, is prepared in advance by a suitable method, then a time interval $T_{2c}$ between $P_2$ and $P_c$ in the state shown in FIG. 3(b) is given in the form $$T_{2c}=1/v(C-\Delta X) \qquad (8)$$

Since both $v$ and $c$ are constants, it is possible to obtain from $T_{2c}$ an output voltage or current proportional to $\Delta X$.

In this way, if correction of $\theta$ is made in the first step, detection of position is easily performed since there is obtained an output voltage or current which is an independent odd function of $\Delta X$ or $\Delta Y$.

In FIG. 3, a pulse PE is a signal synchronizing the slit S and is produced by a suitable method at the beginning of each frequency to set a boundary of one frequency. As is evident from the foregoing which fully describes a form of a mark for position detection according to the present invention and a detection method utilizing said mark, the present invention consists in that, among the marks provided on a body to be detected, line segments intersecting the scanning loci of the detection medium are utilized in the following way: the rotation angle in the plane is detected from the time interval between the two pulses produced when the two scanning lines of said detection medium pass through said segments, the measurement of the $y$ direction is done from the time interval between a pulse produced when the scanning line passes through the segment intersecting the latter obliquely, and detection in the $x$ direction is performed by measuring a time interval between a signal produced when the scanning line passes through the segment orthogonal to the scanning locus of said detection medium and a pulse indicating a central position.

Next, a method to form a detection mark according to the present invention will be explained.

One known method of forming an electrode on a semiconductor pellet is the vacuum deposition method, in which, ordinarily, a mask for forming an electrode is provided through the intermediary of a spacer on a wafer of silicon or germanium which is placed on a heated plate, an electrode forming material placed above the mask is heated by a tungsten heater or the like, and then coating by evaporation is done in a vacuous state higher than $10^{-5}$ mm. Hg.

In one embodiment of the method to form a detection mark according to the present invention, a pattern as shown in FIG. 4 is used for said mask. In the evaporation process, different masks, one for forming an electrode and the other for forming a detection mark may be used in conjunction with a continuous evaporating means, or evaporation may be performed simultaneously by providing one mask with a pattern for electrode formation and a pattern for a position detection mark as shown in FIG. 4. A preferred experiment carried out by the inventors shows that it is advisable to use latter mask and to evaporate a position detection mark and an electrode at the same time upon a mirror polished surface of a silicon wafer or upon an insulator film of $SiO_2$ or the like covering said surface. In addition to the fact that the mark formed in this method fully satisfies the above-mentioned requirements, which the mark should fulfill, this method provides a good result as to the accuracy of the position of the mark relative to the electrode as well as the accuracy of the size of the mark itself. Describing a method to manufacture the mask more specifically, hatched portions of a thin metallic plate shown in FIG. 4 are removed by a suitable method to provide openings for forming detection marks 5 and openings for electrode formation 7. FIG. 5 is a plan view showing a part of the detection marks 5' and the electrodes 7' deposited upon the silicon wafer 6 by use of the mask shown in FIG. 4. If the wafer shown in FIG. 5 is cut along the lines $p$, $q$, $r$ and $s$, the pellet 1 as shown in FIG. 1 is obtained. In FIGS. 4 and 5, the geometrical relation of the electrode part is inexact, but in actual cases, an opening for electrode formation is provided in a place surrounded by the openings of the mask prepared to form the detection marks, which at least lies in the region 3 in FIG. 1 where the electrode is allowed to exist, and the opening for forming the detection mark 5 and that for forming the electrode carry a certain fixed relation in their positions' It is also possible to form detection marks in a pattern as shown in FIG. 4 by a known method of photo-engraving process after the evaporation of metal over the entire surface of the wafer.

Since, as is seen from the foregoing description, a detection mark according to the present invention can be formed simultaneously with an electrode, it can be formed without using any other complicated process such as a marking process. It is another advantage of the invention that a mask is easily fabricated since, as is evident from FIG. 4, the form of a mark is very simple. It is a further advantage of the invention that no highly skilled technique is required in a scribing process in which a wafer is cut out into a pellet after formation of a detection mark, since electric pulses dealt with in practice as detection signals are ones produced when the scanning line passes each of sides $2_1'$, $2_2'$ $2_3'$ and $2_4'$ shown in FIG. 1.

Figure 6A:
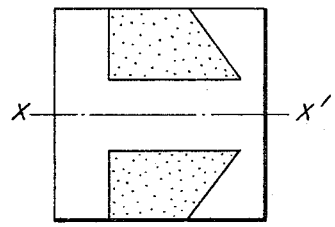
Figure 6B:
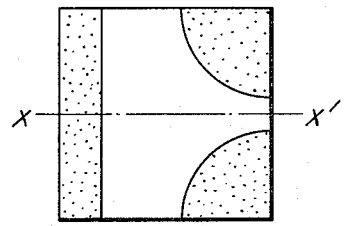
Figure 6C:
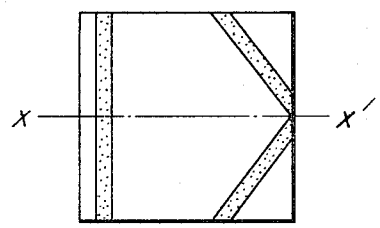

FIGS. 6(a) to 6(c) show other embodiments of the detection marks according to the present invention. In the figures, parts shown by a pepper-and-salt pattern are parts having a higher reflectivity against radiant light or giving a stronger intensity of reflected light.

In the above examples which use a semiconductor pellet, the semiconductor pellet is soldered onto a support member such as a stem, and the invention is applied when a connector lead wire is connected to an electrode on the pellet. In this case, said support member should be moved so that the $x$–$x'$ axis of the pellet plane projected onto the screen coincides substantially with the X–X' axis of the projected plane, otherwise it may happen that the slit S' cannot scan both the lines $2_1'$ and $2_3'$.

It is possible to use an electron beam instead of the aforementione radiant light as a detection medium. When an electron beam is used, a variation of intensity of the scanning electron beam is detected while covering the parts other than said detection marks $2_1$, $2_2$, $2_3$ and $2_4$ with an insulating material.

As described above, the lines $2_1'$, $2_2'$ $2_3'$ and $2_4'$ are provided by transition lines, that is boundary lines discriminating surfaces states different in their response to a detection medium.

In the foregoing description, the invention is explained with particular reference to a semiconductor pellet. However, this is presented merely as an example which may serve better understanding of the invention, and the scope of the invention is by no means restricted thereto. It will be obvious for one skilled in the art that the present invention can be applied to a detection mark of any other similar body without thereby departing from the spirit of the invention, and that the invention has a very wide range of industrial application.

What is claimed is:

1. A body comprising a detection mark for indirect detection of an objective part thereof, said body including a substrate comprising the objective part whose position is to be detected and at least a pair of lines provided on one principal surface of said substrate in a geometrical relation with said objective part wherein each of said lines is provided by a boundary line discriminating two surface states and defined on the principal surface of the substrate by two adjoining surfaces differing in their response to a detection medium, one of said two lines being a straight line orthogonal to a line of direction through said objective part in a parallel relation with said principal surface and the other being a line crossing said line of direction obliquely.

2. A body as described in claim 1, in which two pairs of said lines are arranged on said principal surface of said substrate so that said pairs are in line symmetry with respect to said line of direction.

3. A body as described in claim 1, characterized in that said substrate is of a form of a thin plate, that said objective part is provided substantially at the center of the principal surface of said thin plate, and that said two pairs of said lines are arranged so that they are in line symmetry with respect to said line of direction.

4. A body as described in claim 1, characterized in that the principal surface of said substrate is substantially in the form of a thin rectangular plate, that said objective part is provided substantially at the center of said principal surface, and that two pairs of said lines are arranged so that they are in line symmetry with respect to said line of direction, said line of direction being in a parallel relation with one side of said rectangular plate.

5. A body as described in claim 1, in which said detection medium is a radiant ray and said response is the intensity of reflected light.

6. A body comprising a detection mark for indirect detection of an objective part thereof, said body including a substrate to be detected, an objective part whose position is to be detected and which lies substantially at the central part of one principal surface of said substrate, a pair of lines which are arranged on one side of said principal surface with respect to a line of direction through said objective part in a parallel relation with said principal surface, one line of said pair being orthogonal to said line of direction and the other line of said pair being oblique to said line of direction, another pair of lines which are arranged on the other side of the principal surface with respect to said line of direction in a line symmetrical relation with said pair of lines with respect to said line of direction, and two surface regions formed on the principal surface separate from said objective part and providing two surface states having different intensities of reflected light in response to a detection medium of light, each of said lines being provided by a boundary line discriminating the two surface states.

7. A body as described in claim 6, in which said substrate is a semiconductor pellet and at least one electrode is provided substantantially at the center of said semiconductor pellet.

8. A body as described in claim 6, characterized in that said substrate is a semiconductor pellet whose principal surface is substantially of a rectangular form, that at least one electrode is formed substantially at the center of the pellet, that one of said surface regions is formed of the same material as is said electrode, said one surface region being arranged at each corner of said rectangular pellet and said line of direction being drawn in parallel relation with one of the sides of said rectangle.

9. A method of detecting indirectly an objective part provided on one principal surface of a body to be detected, which comprises the steps of:
 (a) preparing a body to be detected having two adjacent surface regions different in their response to a detection medium and arranged on said principal surface and separated from said objective part so that first boundary lines form straight lines orthogonal to a line of direction drawn through said objective part in a parallel relation with said principal surface, second boundary lines cross obliquely said line of direction, and at the same time pairs of lines each consisting of one of the orthogonal lines and one of the oblique lines are mutually in line symmetry with respect to said line of direction,
 (b) obtaining a pair of trains of pulses including pulse signals corresponding to said orthogonal straight lines and said oblique lines by scanning pairs each comprising said orthogonal straight line and said oblique line with a pair of detection media, respectively,
 (c) detecting a rotation angle of said line of direction relative to a predetermined standard line by measuring a time difference between a pulse which corresponds to said orthogonal straight line of one pair and included in one train of said pulses and a pulse which is included in the other train of said pulses and corresponds to said orthogonal straight line of the other pair,
 (d) detecting a displacement of said line of direction relative to said standard line by measuring a time difference between $t_1$ and $t_2$, where $t_1$ denotes a time difference between two pulses included in said one train of pulses, one corresponding to said orthogonal straight line and the other to said oblique line, and $t_2$ denotes a time difference between two pulses included in said other train of pulses, one corresponding to said orthogonal straight line and the other to said oblique line, and
 (e) detecting a distance between a standard point fixed upon said standard line and a central point provided on said line of direction on said body to be detected, by measuring a time difference between a standard pulse and either one of said trains of pulses.

10. A method for locating an objective part provided on one principal surface of a body to be detected at a predetermined position, comprising the steps of:
 (a) preparing a body to be detected having two adjacent surface regions different in their response to a detection medium and arranged on said principal surface and separated from said objective part so that first boundary lines form straight lines orthogonal to a line of direction drawn through said objective part in a parallel relation with said principal surface, second boundary lines cross obliquely said line of direction, and at the same time pairs of lines each consisting of one of the orthogonal straight lines and one of the oblique lines are mutually in line symmetry with respect to said line of direction,
 (b) obtaining a pair of trains of pulses including pulse signals corresponding to said orthogonal straight lines and said oblique liner by scanning pairs each comprising said orthogonal straight line and said oblique line by use of a pair of detection media, respectively,
 (c) controlling a rotation angle of said line of direction relative to a predetermined standard line so as to make a time difference between a pulse which is included in one train of said pulses and corresponds to said orthogonal straight line of one pair and a pulse which is included in the other train of said pulses and corresponds to said orthogonal straight line of the other pair equal to zero,
 (d) controlling a distance of said line of direction from said standard line so as to make a time difference between $t_1$ and $t_2$ equal to zero, where $t_1$ denotes a time difference between two pulses included in said one train of pulses, one corresponding to said orthogonal straight line and the other to said oblique line, and $t_2$ denotes a time difference between two pulses included in said other train of pulses, one corresponding to said orthogonal straight line and the other to said oblique line, and
 (e) controlling a distance between a standard point set on said standard line and a central point provided on said line of direction on said body to be detected so that a time difference between said one pulse corresponding to said orthogonal straight line and a standard pulse may assume a predetermined value, thereby to make the displacement equal to zero.

11. A method of detecting indirectly a position of at least one electrode provided on one principal surface of a semiconductor pellet, comprising the steps of:
  (a) preparing a semiconductor pellet having two kinds of adjacent surface regions which give different intensities of reflected light against light arranged on said principal surface and separated from said electrode part so that first boundary lines form straight lines orthogonal to a line of direction drawn through said electrode part in a parallel relation with said principal surface, second boundary lines form lines in an oblique relation with said imaginary center line, and at the same time pairs each consisting of one of said orthogonal straight lines and one of said oblique lines are in line symmetry with respect to said line of direction,
  (b) projecting said principal surface of said semiconductor pellet onto a projection screen for magnification,
  (c) rendering a pair of slits to scan across each of said pairs comprising said orthogonal straight line and said oblique line which are projected onto said screen,
  (d) converting the light passing through said pair of slits into a pair of trains of pulses by use of a photosensitive element,
  (e) detecting a rotation angle of said line of direction relative to a predetermined standard line by measuring a time difference between a pulse which is included in one of said trains of pulses and corresponds to said orthogonal straight line and a pulse which is included in the other train of pulses and corresponds to said orthogonal straight line,
  (f) detecting a displacement of said line of direction relative to said standard line by measuring a time difference between $t_1$ and $t_2$, where $t_1$ denotes a time difference between two pulses included in one of said trains of pulses, one corresponding to said orthogonal straight line and the other to said oblique line, and $t_2$ is a time difference between two pulses included in the other train of pulses, one corresponding to said orthogonal straight line and the other to said oblique line, and
  (g) detecting a discrepancy between a standard point set on said standard line and a center line on said semiconductor pellet by measuring a time difference between either one of the pulses included in said trains of pulses and a standard pulse.

12. A detection method as described in claim 8, in which one of said surface regions is formed of the same material as is used to form said electrode.

References Cited
UNITED STATES PATENTS

| | | | |
|---|---|---|---|
| 837,616 | 12/1906 | Dunwoody | 317—236 |
| 3,293,440 | 12/1966 | Mueller | 317—235 X |
| 3,302,051 | 1/1967 | Galginaitis | 317—235 X |
| 3,309,553 | 3/1967 | Kroemer | 317—235 X |

JAMES D. KALLAM, *Primary Examiner.*

U.S. Cl. X.R.

29—587; 317—236